(12) United States Patent
Guthrie et al.

(10) Patent No.: US 6,632,556 B2
(45) Date of Patent: Oct. 14, 2003

(54) MANIFOLD ASSEMBLY FOR A FUEL CELL POWER PLANT

(75) Inventors: Robin J. Guthrie, East Hartford, CT (US); Tomas J. Corrigan, Coventry, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 158 days.

(21) Appl. No.: 09/740,499

(22) Filed: Dec. 19, 2000

(65) Prior Publication Data

US 2002/0076601 A1 Jun. 20, 2002

(51) Int. Cl.[7] .................................................. H01M 2/02
(52) U.S. Cl. ............................ 429/34; 429/12; 429/13; 429/30; 429/38
(58) Field of Search .............................. 429/12, 13, 30, 429/34, 38

(56) References Cited

U.S. PATENT DOCUMENTS

| | | | |
|---|---|---|---|
| 3,994,748 A | 11/1976 | Kunz et al. | |
| 4,212,929 A | 7/1980 | Grevstad et al. | |
| 4,910,099 A | 3/1990 | Gottesfeld | |
| 5,316,747 A | 5/1994 | Pow et al. | |
| 5,330,727 A | 7/1994 | Trocciola et al. | |
| 5,432,021 A | 7/1995 | Wilkinson et al. | |
| 5,456,889 A | 10/1995 | Pow et al. | |
| 5,482,680 A | 1/1996 | Wilkinson et al. | |
| 5,486,430 A | 1/1996 | Gorbell et al. | |
| 5,514,487 A | 5/1996 | Washington et al. | |
| 5,518,705 A | 5/1996 | Buswell et al. | |
| 5,798,186 A | 8/1998 | Fletcher et al. | |
| 5,885,729 A | * 3/1999 | Marchetti | 427/115 |
| 6,110,612 A | * 8/2000 | Walsh | 429/13 |
| 6,403,247 B1 | * 6/2002 | Guthrie et al. | 429/17 |

FOREIGN PATENT DOCUMENTS

| | | |
|---|---|---|
| DE | 100 49 801 A1 | 4/2001 |
| JP | 08171926 A | 2/1996 |
| JP | 2001110439 A | 4/2001 |

* cited by examiner

Primary Examiner—Carol Chaney
Assistant Examiner—Dah Wei D Yuan
(74) Attorney, Agent, or Firm—McCormick, Paulding & Huber LLP (57) ABSTRACT

A fuel cell power plant includes a first cell stack assembly having a plurality of planar fuel cells in electrical communication with one another and a second cell stack assembly having a plurality of planar fuel cells in electrical communication with one another. An inter-stack manifold assembly is disposed between the first and second cell stack assemblies and provides an electrical pathway between the first and second cell stack assemblies. A baffle is formed internally to the manifold assembly for feeding a substantially uniform proportion of a reactant stream to the first and second cell stack assemblies while collecting an exhausted reactant stream from the first and second cell stack assemblies.

18 Claims, 7 Drawing Sheets

MANIFOLD ASSEMBLY FOR A FUEL CELL POWER PLANT

FIELD OF THE INVENTION

This invention relates in general to a manifold assembly for a fuel cell power plant, and deals more particularly with an inter-stack manifold assembly in a PEM fuel cell power plant which minimizes both weight and volume while ensuring uniform distribution of reactants to adjacent cell stack assemblies.

BACKGROUND OF THE INVENTION

Electrochemical fuel cell assemblies are known for their ability to produce electricity and a subsequent reaction product through the interaction of a reactant fuel being provided to an anode electrode and a reactant oxidant being provided to a cathode electrode, generating an external current flow there-between. Such fuel cell assemblies are very useful due to their high efficiency, as compared to internal combustion fuel systems and the like, and may be applied in many fields. Fuel cell assemblies are additionally advantageous due to the environmentally friendly chemical reaction by-products, typically water, which are produced during their operation. Owing to these characteristics, amongst others, fuel cell assemblies are particularly applicable in those fields requiring highly reliable, stand-alone power generation, such as is required in space vehicles and mobile units including generators and motorized vehicles.

Typically, electrochemical fuel cell assemblies employ reactants such as a hydrogen-rich gas stream as a fuel and an oxygen-rich gas stream as an oxidant, whereby the resultant reaction by-product is water. Such fuel cell assemblies may employ a membrane consisting of a solid polymer electrolyte, or ion exchange membrane, disposed between the anode and cathode electrodes formed of porous, electrically conductive sheet material—typically, carbon fiber paper. One particular type of ion exchange membrane is known as a proton exchange membrane (hereinafter PEM), such as sold by DuPont under the trade name NAFION™ and well known in the art. Catalyst layers are formed between the PEM and each electrode to promote the desired electrochemical reaction. The catalyst layer in a fuel cell assembly is typically a carbon supported platinum or platinum alloy, although other noble metals or noble metal alloys may be utilized. In order to control the temperature within the fuel cell assembly, a water coolant is typically provided to circulate about the fuel cell assembly.

In the typical operation of a PEM fuel cell assembly, a hydrogen rich fuel permeates the porous electrode material of the anode and reacts at the catalyst layer to form hydrogen ions and electrons. The hydrogen ions migrate through the PEM to the cathode electrode while the electrons flow through an external circuit connected to a load. At the cathode electrode, the oxygen-containing gas supply also permeates through the porous substrate material and reacts with the hydrogen ions and the electrons from the anode electrode at the catalyst layer to form the by-product water. Not only does the PEM facilitate the migration of these hydrogen ions from the anode to the cathode, but the ion exchange membrane also acts to isolate the hydrogen rich fuel from the oxygen-containing gas oxidant. The reactions taking place at the anode and cathode catalyst layers may be represented by the following equations:

Anode reaction: $H_2 \rightarrow 2H^+ + 2e$

Cathode reaction: $\frac{1}{2}O_2 + 2H^+ + 2e \rightarrow H_2O$

In practical applications, a plurality of planar fuel cell assemblies are typically arranged in a stack, commonly referred to as a cell stack assembly. The cell stack assembly may be surrounded by an electrically insulating housing that defines the various manifolds necessary for directing the flow of a hydrogen-rich fuel and an oxygen-rich oxidant to the individual fuel cell assemblies, as well as a coolant stream. A fuel cell power plant may typically be comprised of the fuel cell stack assembly, reactant storage vessels, reactant control valves, reactant propulsion devices, coolant pumps, heat exchangers, coolant degassifiers or demineralizers, sensors for measuring reactant concentrations, temperatures, pressures, current, voltage, and a microprocessor that controls the operation of the fuel cell power plant.

As will be appreciated by one so skilled in the art, tying these differing components into a cohesive fuel cell power plant operating within specific design parameters results in a complex and oftentimes cumbersome structure.

Specifically, the many components of a fuel cell power plant typically result in a weighty structure having a considerable volume, thereby making integration of the fuel cell power plant in motor vehicles and the like difficult. In addition, many fuel cell power plants include two or more cell stack assemblies in electrical communication with one another, each of these cell stack assemblies requiring a carefully controlled supply and exhaust of reactant fuel and oxidant to operate efficiently.

With the forgoing problems and concerns in mind, the present invention therefore seeks to decrease the weight and volume associated with a multiple cell stack assembly fuel cell power plant, while ensuring the uniform distribution of fuel and oxidant reactants.

SUMMARY OF THE INVENTION

It is an object of the present invention to increase the operational efficiency of a fuel cell power plant.

It is another object of the present invention to reduce the height of a fuel cell power plant.

It is another object of the present invention to reduce the weight and volume of a fuel cell power plant.

It is another object of the present invention to ensure the uniform distribution of reactants to cell stack assemblies comprising a fuel cell power plant.

It is another object of the present invention to provide a center structural support for a fuel cell power plant.

It is another object of the present invention to provide a center structural support for a fuel cell power plant which is capable of carrying current from one cell stack assembly to another in a fuel cell power plant.

It is another aspect of the present invention to increase the vibrational stability of a fuel cell power plant.

According to one embodiment of the present invention, a fuel cell power plant includes a first cell stack assembly having a plurality of planar fuel cells in electrical communication with one another and a second cell stack assembly having a plurality of planar fuel cells in electrical communication with one another. An inter-stack manifold assembly is disposed between the first and second cell stack assemblies and provides an electrical pathway between the first and second cell stack assemblies. A baffle is formed internally to the manifold assembly for diverting a substantially uniform proportion of a reactant stream to the first and second cell stack assemblies while diverting an exhausted reactant stream from the first and second cell stack assemblies.

These and other objectives of the present invention, and their preferred embodiments, shall become clear by consideration of the specification, claims and drawings taken as a whole.

DETAILED DESCRIPTION OF THE PREFERRED EMBODIMENT

The present invention is generally directed towards minimizing the height, weight and volume of a PEM fuel cell power plant comprising two or more cell stack assemblies. It will be readily appreciated that the fuel cell power plant of the present invention is comprised of those components necessary to enable operation of, and electrical generation from, the fuel cell power plant, including but not limited to: a plurality of electrically integrated planar PEM fuel cells; various conduits, valves and contamination removal devices for controlling and cleansing the flow of reactants and coolants; and an integrated control system for monitoring the reactant flow rates and operating temperature of the fuel cell power plant so as to effectuate changes in these and other parameters, thereby maintaining the fuel cell power plant at approximately optimal operating conditions.

Figure 1:
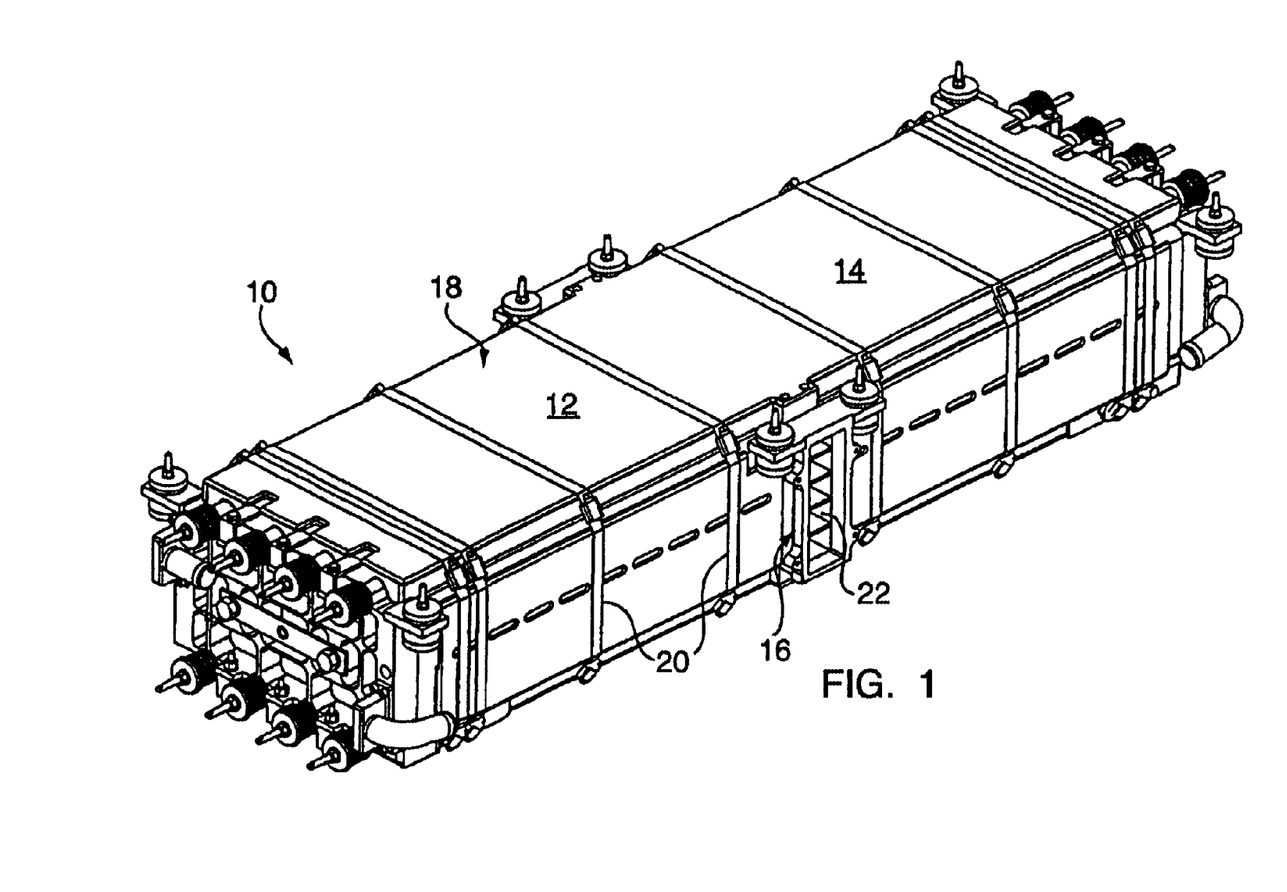
FIG. 1 is a front view of a fuel cell power plant according to one embodiment of the present invention.
Figure 2:
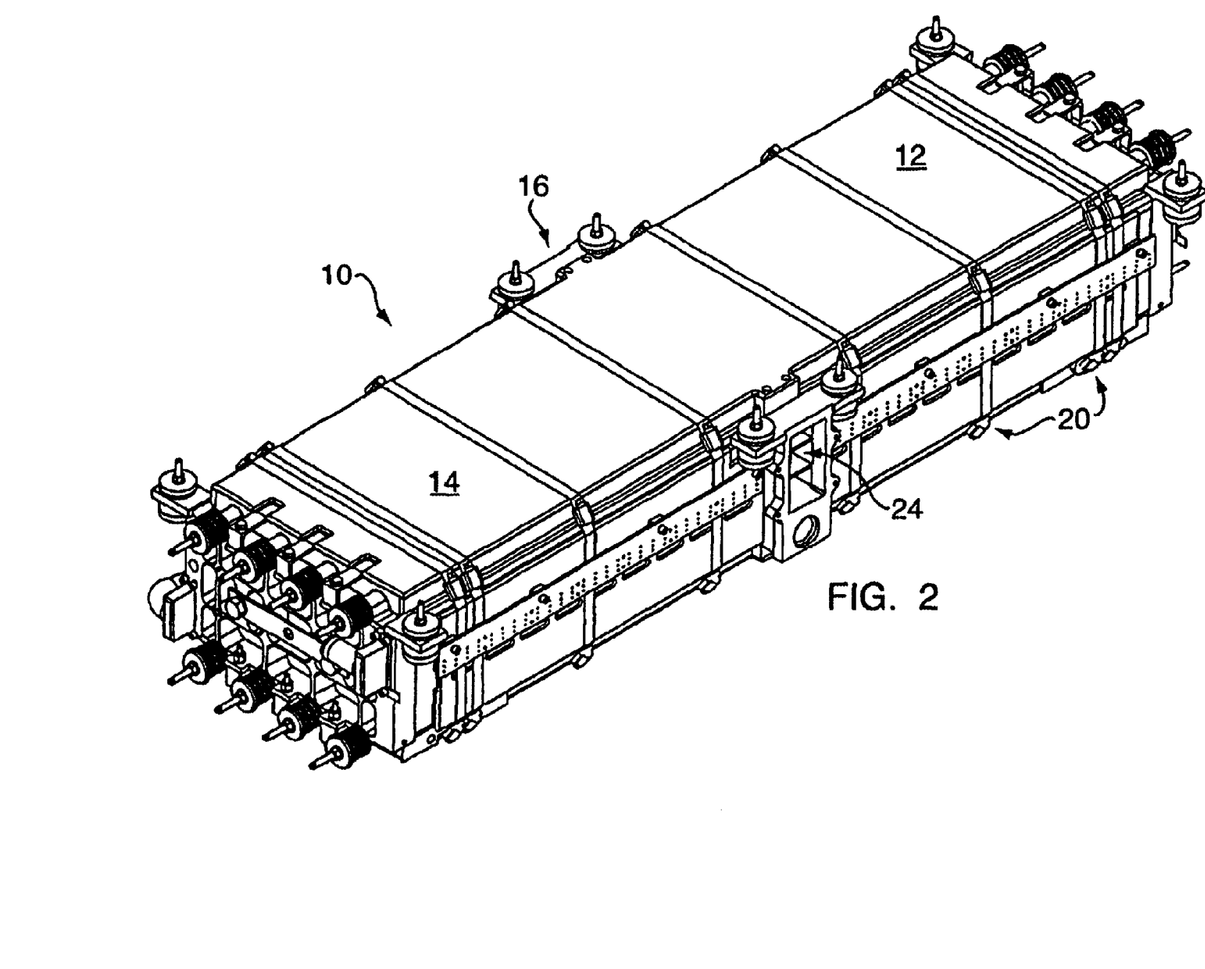
FIG. 2 is a rear view of the fuel cell power plant shown in FIG. 1.

FIGS. 1 and 2 depict a front and rear view, respectively, of a fuel cell power plant 10, according to one embodiment of the present invention. The fuel cell power plant 10 is comprised of a first cell stack assembly 12 and a second cell stack assembly 14 in electrical communication with one another. Interposed between the cell stack assemblies 12 and 14 is an inter-stack reactant manifold assembly 16, to be described in more detail later, which serves to direct the flow of reactants to and from the cell stack assemblies 12 and 14. A power plant housing 18 is formed about the manifold assembly 16 and the cell stack assemblies 12 and 14. The power plant housing 18 provides an internally secure compartment within which the flow of gaseous reactants and (typically) a liquid coolant may be circulated to the cell stack assemblies 12 and 14 free from gaseous communication with the outside environment. A series of straps and buckles 20 are utilized to secure the power plant housing 18 to the cell stack assemblies 12 and 14 in a manner well known in the art.

It will be readily appreciated that securing methods other than the straps and buckles 20 depicted in FIGS. 1 and 2 may be alternatively employed, such as tie rods or the like, without departing from the broader aspects of the present invention.

Referring once again to FIGS. 1 and 2, the manifold assembly 16 includes a front inlet opening 22 and a rear exhaust opening 24 through which an oxidant reactant, typically an oxygen-rich gaseous stream, is fed to the cell stack assemblies 12 and 14 and exhausted therefrom, respectively. An unillustrated oxidant pump may be utilized to provide the oxidant stream to the cell stack assemblies 12 and 14 through the front opening 22, although other alternative oxidant supply mechanisms, including passive forced air systems, may be employed without departing from the broader aspects of the present invention.

Figure 3:
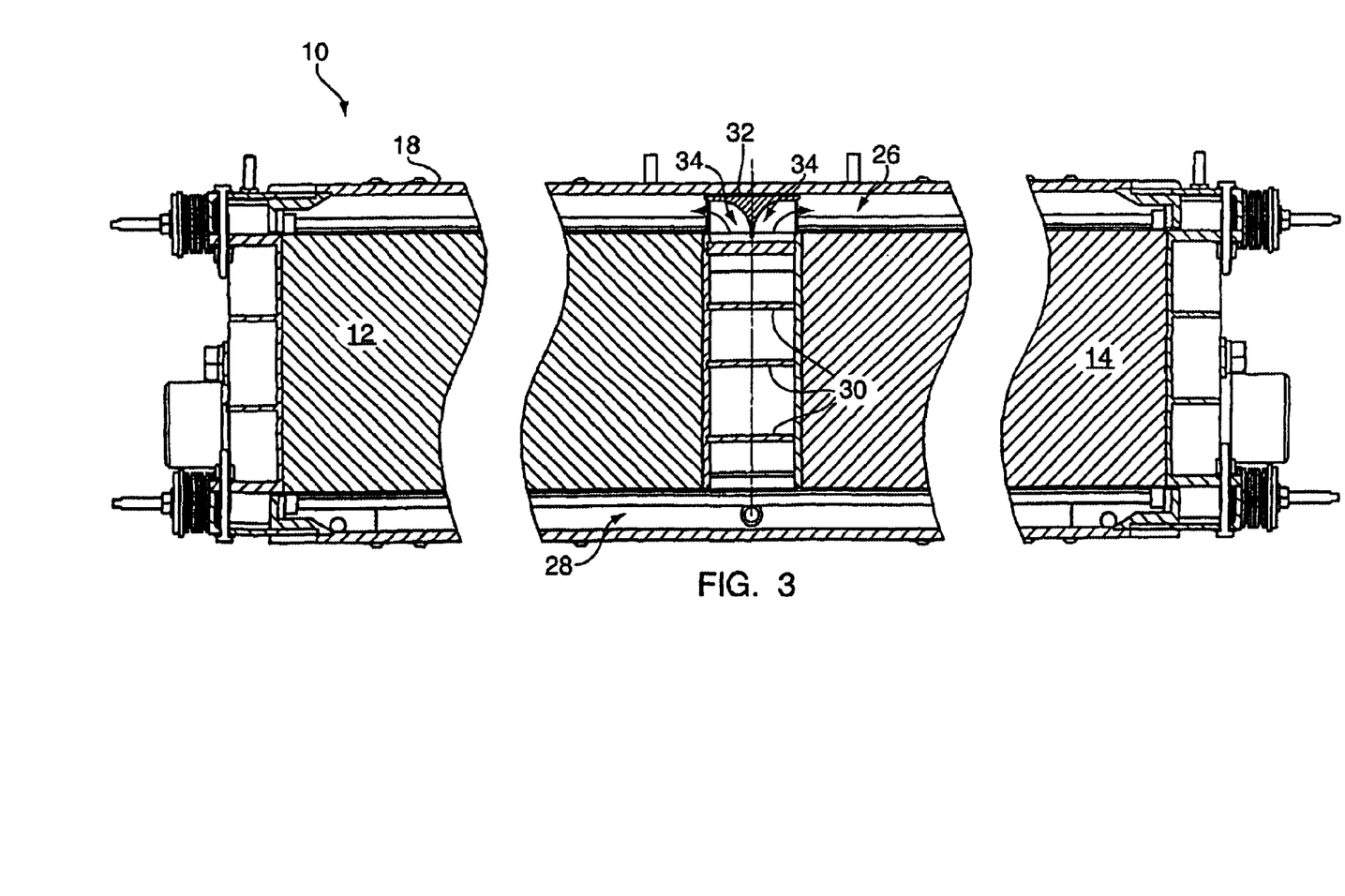
FIG. 3 is a partial cross-sectional view of the fuel cell power plant of FIG. 1 illustrating the inter-stack manifold assembly of the present invention.

Turning now to FIG. 3, a partial cross-sectional view of the power plant 10 is shown, wherein the structural orientation of the manifold assembly 16 in relation to the housing 18 and the cell stack assemblies 12 and 14 is more clearly depicted. As shown in FIG. 3, the manifold assembly 16 is disposed between the cell stack assemblies 12 and 14 so as to direct an oxidant stream to an oxidant inlet plenum 26. The oxidant inlet plenum 26 has an outer wall formed by the housing 18 and is in fluid communication with the edge portions of a plurality of planar PEM fuel cells comprising each of the fuel cell assemblies 12 and 14. Once passage of the oxidant stream through the PEM fuel cells is accomplished, an oxidant exhaust plenum 28 directs the exhausted oxidant stream back to the manifold assembly 16 and out the rear exhaust opening 24.

A number of interior baffles 30 are also illustrated in FIG. 3 and serve to direct the oxidant stream entering via the front inlet opening 22 upwards through the manifold assembly 16 and towards the oxidant inlet plenum 26. A manifold header 32 is disposed adjacent a top portion of the manifold assembly 16 and includes two arched passageways 34 for directing a substantially equal percentage of the oxidant stream towards each of the cell stack assemblies 12 and 14. Although viewed in cross-section in FIG. 3, the interior baffles 30 are additionally arranged to direct the exhausted oxidant from the oxidant exhaust plenum 28 out of the manifold assembly 16 via the rear exhaust opening 24, as will be shown more clearly in connection with FIGS. 4 and 5.

It is therefore an important aspect of the present invention that a single manifold assembly 16 may distribute a substantially equal amount of supplied oxidant to each of the cell stack assemblies 12 and 14, thereby reducing the overall height, weight and volume of the fuel cell power plant 10. Moreover, the weight and volume of the fuel cell power plant 10 is further reduced by utilizing the housing 18 to assist in the direction of the oxidant stream to each of the cell stack assemblies 12 and 14.

Figure 4:
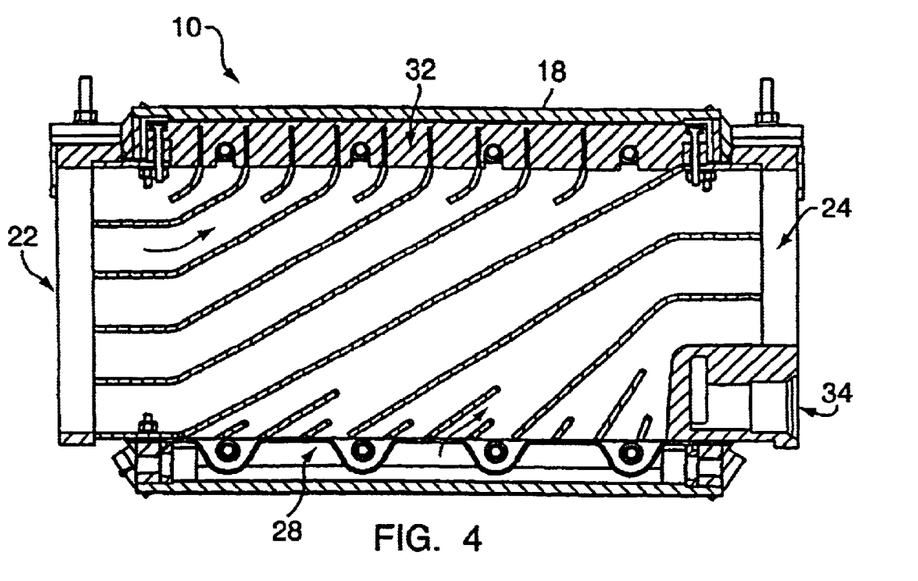
FIG. 4 is a cross-sectional view of the inter-stack manifold assembly according to the preferred embodiment of the present invention.

FIG. 4 of the present invention is a cross-sectional view of the manifold assembly 16 and more clearly illustrates one preferred arrangement of the interior baffles 30. As the oxidant stream enters the manifold assembly 16 via the front inlet opening 22, a plurality of baffles 30 are arranged to divert the oxidant stream upwards towards the manifold header 32 and the oxidant inlet plenum 26. Similarly, exhausted oxidant is urged from the oxidant exhaust plenum 28 and into the manifold assembly 16 to be subsequently diverted towards the rear exhaust opening 24. As further illustrated in FIG. 4, a fuel inlet opening 34 may also be provided in the manifold assembly 16 for providing the cell stack assemblies 12 and 14 with a supply of reactant fuel. It will be readily apparent that the manifold assembly 16 may also be configured to accept a coolant stream via an opening similar to the opening 34 without departing from the broader aspects of the present invention.

Figure 5:
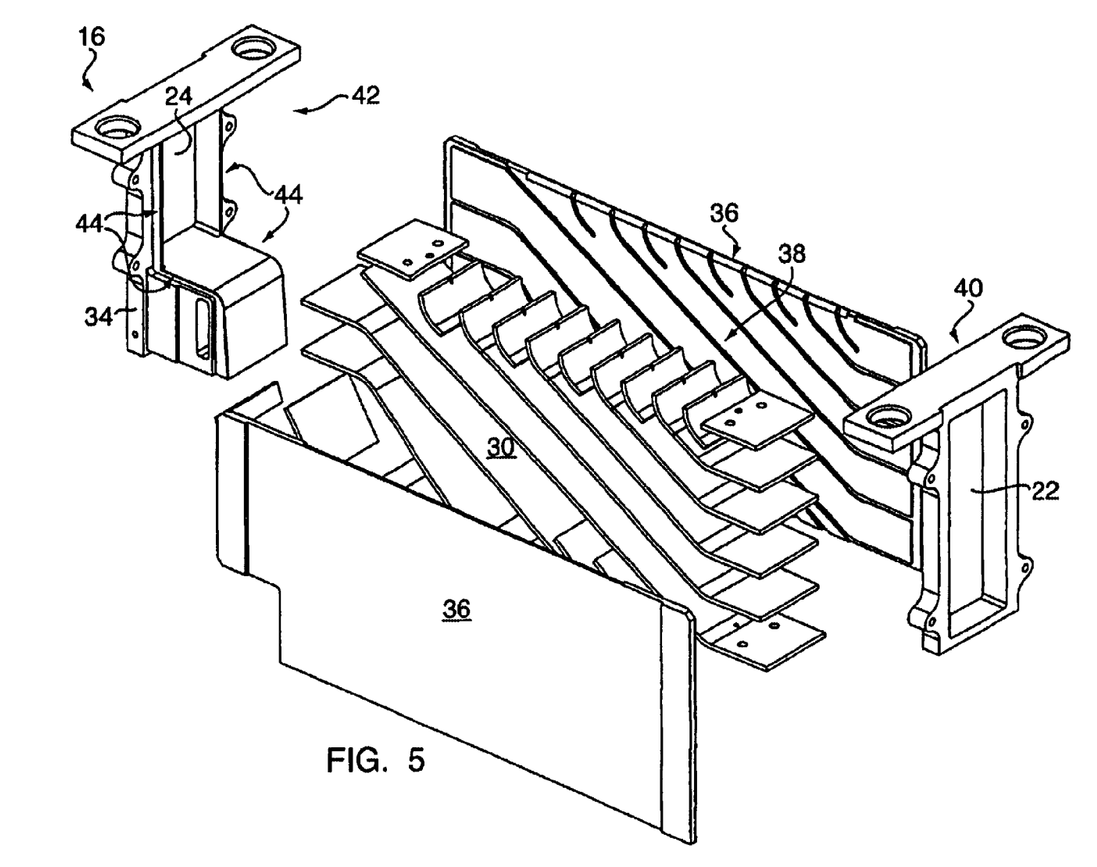
FIG. 5 is an exploded view of the inter-stack manifold assembly of FIG. 4.

Turning to FIG. 5, an exploded view of the manifold assembly 16 is depicted. As shown in FIG. 5, a pair of side walls 36 are formed to include a plurality of grooves 38 within which the baffles 30 are disposed when the manifold assembly 16 is assembled. A front end piece 40 and a rear end piece 42 serve to cap the ends of the manifold assembly 16 and are provided with apertures for the front inlet opening 22, the rear exhaust opening 24 and the fuel inlet opening 34. As best seen in the view of the rear end piece 42, a pair of longitudinal grooves 44 may be formed in the edges of the rear end piece 42 and the front end piece 40 to accommodate mating edges of the side walls 36, however the present invention contemplates alternative mating configurations without departing from the broader aspects of the present invention.

The constituent elements of the manifold assembly 16 as shown in FIG. 5 may be made from any strong, lightweight material such as stainless steel, aluminum or aluminum alloy and, as mentioned above, may be braised, casted or machined together to form the resultant manifold assembly 16. Moreover, the manifold assembly 16 must be capable of providing a conductive pathway between the cell stack assemblies 12 and 14. Towards this end the side walls 36, as well as the baffles 30 and any portion of the manifold assembly 16 which directly contacts the cell stack assemblies 12 and 14, may be coated with a conductive layer, such as a gold or other noble metal plating, including other suitable plating materials such as nickel and nickel alloys and the like.

Figure 6:
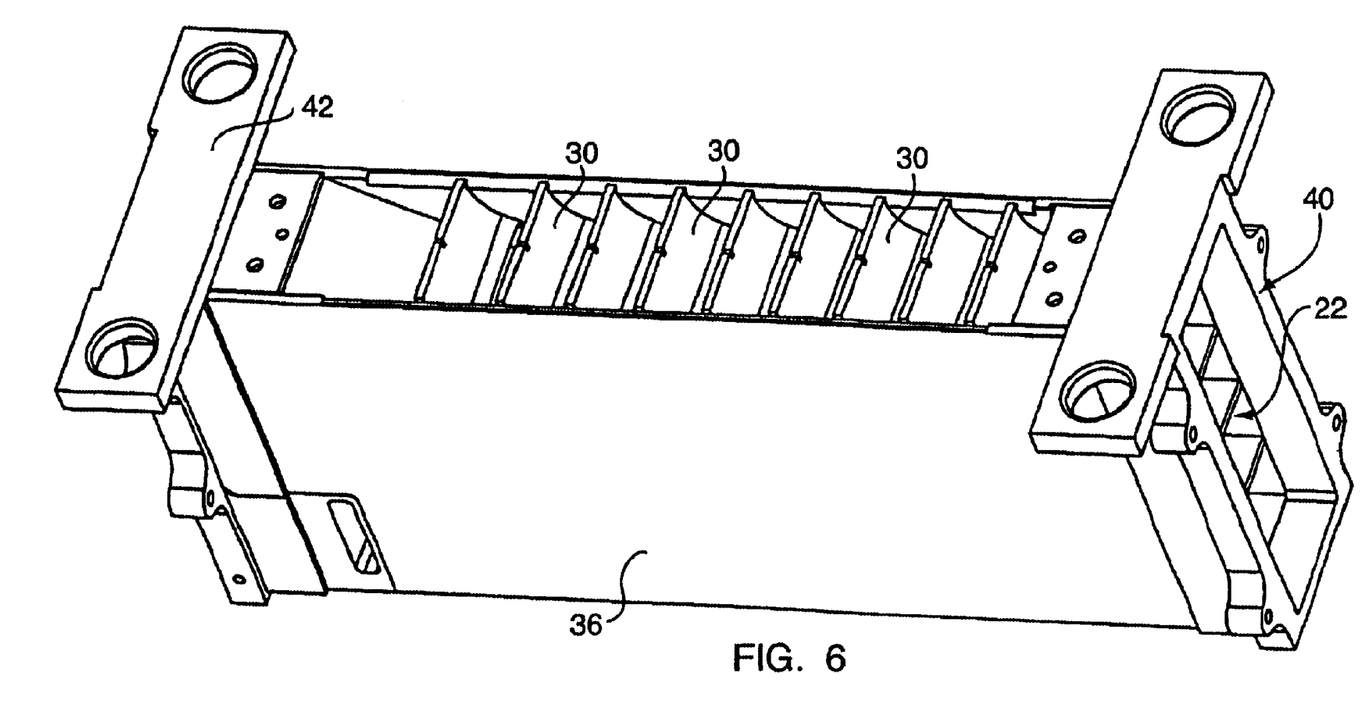
FIG. 6 is an assembled view of the inter-stack manifold assembly of FIG. 4.

It is another important aspect of the present invention that the baffles 30 not only provide for the uniform distribution of oxidant about the width of the adjacent cell stack assemblies 12 and 14, but also provide uniform conduction of electricity from one cell stack assembly to the other. Moreover, the baffles 30 act to protect the manifold assembly 16 as a whole from the compressive forces utilized to hold the cell stack assemblies 12 and 14 together by transferring these forces through the manifold assembly 16 when assembled, as shown in FIG. 6.

It will be readily appreciated that the present invention advantageously provides for the uniform distribution of reactant oxidant, as well as fuel and coolant, to two or more cell stack assemblies, while reducing the overall weight and volume of such an apparatus by as much as 50% or more compared to end-manifolded fuel cell power plants.

The reduction of weight and volume in a fuel cell power plant is especially important in those applications where these particular concerns are paramount, such as automotive applications. When employed in automotive environments, the inter-stack manifold assembly 16 of present invention has several beneficial aspects including providing a measured increase in the structural support for the fuel cell power plant 10 as a whole. Moreover, the body of the manifold assembly 16, especially the front and rear end pieces, 42 and 44 respectively, provide structural attachment points located at the center of the fuel cell power plant 10 to more assuredly affix the fuel cell power plant 10 to the base of an automobile, such as below the passenger compartment. The front and rear end pieces, 42 and 44 respectively, also significantly increase, on the order of four times, the natural frequency of the fuel cell power plant 10 as a whole, thereby acting to minimize the effects of vehicle induced vibration of the cell stack assemblies 12 and 14.

Another beneficial aspect of center feeding a fuel cell power plant with the disclosed inter-stack manifold assembly 16, in conjunction with automotive applications, is that the front inlet opening 22 may be oriented to face the front of the vehicle where blowers, radiators and the like are commonly situated. Moreover, the rear exhaust opening 24 correspondingly faces the rear fuel storage compartment of many vehicles. With such a configuration, various conduits for supplying the manifold assembly 16 with an oxidant reactant from the front of the vehicle and a fuel reactant from the rear of the vehicle may advantageously run the length of the vehicle in the center section thereof, which is commonly situated beneath the passenger seats in the vehicle. This results in a minimum impact on the passenger compartment of the vehicle.

Figure 7:
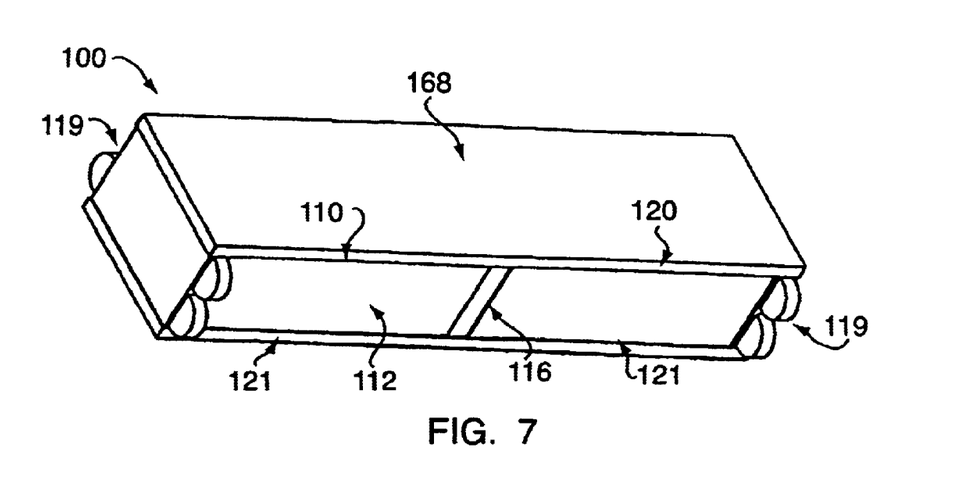
FIG. 7 is a front view of a fuel cell power plant according to another embodiment of the present invention.

FIG. 7 illustrates a fuel cell power plant 100 with an integrated inter-stack manifold assembly 116 according to another embodiment of the present invention. As depicted in FIG. 7, the power plant 100 includes a first cell stack assembly 112 and a second cell stack assembly 114 oriented one either side of the manifold assembly 116. A housing 118 is also provided, including end plates 119 which may be shaped to act as a turn manifold for supplying the power plant 100 with a coolant stream or the like. Similar to the embodiment of FIGS. 1–6, a reactant oxidant stream is provided to the manifold assembly 116, distributed substantially uniformly to each of the cell stack assemblies, 112 and 114 respectively, via an inlet oxidant plenum 120 formed in the housing 118, and exhausted through the manifold assembly 116 via an exhaust oxidant plenum 121.

Figure 8:
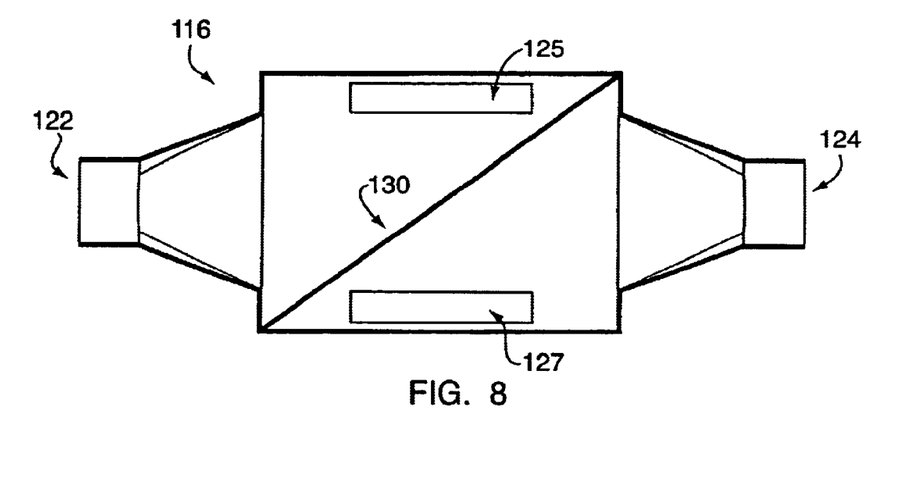
FIG. 8 is a cross-sectional view of the inter-stack manifold assembly shown in FIG. 7.

FIG. 8 is a cross-sectional side view of the manifold assembly 116 illustrating an inlet opening 122 and an exhaust opening 124. A reactant oxidant egress 125 is formed in the manifold assembly 116 and serves to direct the reactant oxidant stream from the manifold assembly 116 to the inlet oxidant plenum 120. While only a single oxidant egress 125 is illustrated in FIG. 8, it will be readily appreciated that a matching egress 125 is formed on the opposing side of the manifold assembly to direct substantially uniform proportions of the oxidant stream to both the first and second cell stack assemblies, 112 and 114 respectively. It will also be readily appreciated that the inlet oxidant plenums 120 may themselves be separate structures, or rather they may be formed, in part, by the housing 118, as described previously in accordance with the embodiments of FIGS. 1–6.

After circulating through the fuel cells comprising each of the cell stack assemblies, 112 and 114, the exhausted oxidant stream will be directed by the exhaust oxidant plenum 121 into the manifold assembly 116 via a pair of exhaust openings 127 and subsequently out of the power plant 100. A cross baffle 130 is utilized within the manifold assembly 116 to ensure separation of the oxidant streams and may be formed diagonally through the manifold assembly, as shown in FIG. 8. In addition, this configuration contains additional support flow vanes which are not shown, but which are conceptually similar to the structure shown in FIG. 4.

Figure 9:
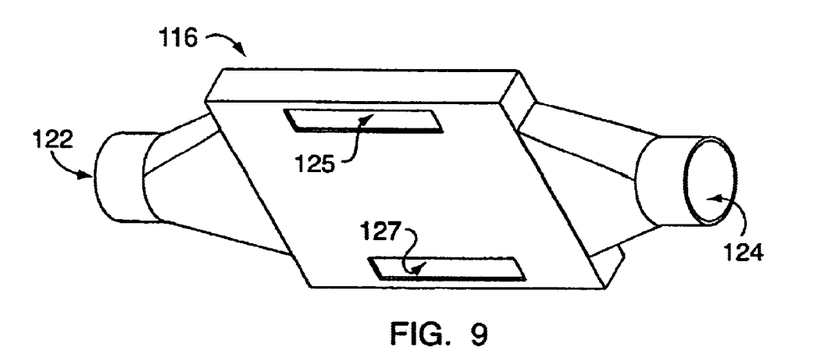
FIG. 9 is an isometric view of the inter-stack manifold assembly shown in FIG. 7.

It will be readily appreciated that the manifold assembly 116, an isometric view of which is illustrated in FIG. 9, performs the same function and is constructed of the same materials as the manifold assembly 16 described above and is similarly capable of conducting an electrical current between the adjacent cell stack assemblies 112 and 114.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A fuel cell power plant, comprising:
   a first cell stack assembly having a plurality of planar fuel cells in electrical communication with one another;
   a second cell stack assembly having a plurality of planar fuel cells in electrical communication with one another;
   an inter-stack manifold assembly disposed between said first and second cell stack assemblies, said manifold assembly providing an electrical pathway between said first and second cell stack assemblies; and
   a baffle formed internally to said manifold assembly, said baffle physically dividing a reactant stream such that a substantially uniform proportion of said reactant stream is directed to said first and second cell stack assemblies, said baffle also collecting an exhausted reactant stream from said first and second cell stack assemblies.

2. A fuel cell power plant according to claim 1, further comprising:
   a housing for encapsulating said first and second cell stack assemblies and said manifold assembly;
   a reactant inlet plenum formed between said housing and said first and second cell stack assemblies for distributing said reactant stream substantially uniformly to each of said first and second cell stack assemblies; and
   a reactant exhaust plenum formed between said housing and said first and second cell stack assemblies for collecting said exhausted reactant stream from each of said first and second cell stack assemblies.

3. A fuel cell power plant according to claim 1, wherein:
   said manifold assembly includes a plurality of baffles disposed between and orthogonal to a pair of side walls of said manifold assembly.

4. A fuel cell power plant according to claim 3, wherein:
   said plurality of baffles and said side walls being formed from a corrosion resistant, electrically conductive material.

5. A fuel cell power plant according to claim 4, wherein:
   said side walls are gold plated.

6. A fuel cell power plant according to claim 4, wherein:
   said side walls are plated by one of nickel and nickel alloy.

7. A fuel cell power plant according to claim 3, wherein:
   said manifold assembly extends the width of said first and said second cell stack assemblies; and
   said plurality of baffles define a plurality of separate reactant inlet pathways within said manifold assembly to feed said reactant stream substantially uniformly across said width of said first and second cell stack assemblies.

8. A fuel cell power plant according to claim 7, wherein:
   said plurality of baffles define a plurality of separate reactant exhaust pathways within said manifold assembly to divert said exhausted reactant stream from across said width of said first and second cell stack assemblies.

9. A fuel cell power plant according to claim 3, wherein:
   said side walls each include a plurality of matching grooves for accommodating said plurality of baffles therein.

10. A fuel cell power plant according to claim 3, wherein:
    said manifold assembly includes a front end piece for defining an inlet opening for accepting said reactant stream and a rear end piece for defining an exhaust opening for exhausting said exhausted reactant stream.

11. A method for increasing the operational efficiency of a fuel cell power plant including two cell stack assemblies each of which are comprised of a plurality of fuel cells in electrical communication with one another; said method comprising the steps of:
    arranging said two cell stack assemblies within a housing;
    disposing an inter-stack manifold assembly between said cell stack assemblies; said manifold assembly being in fluid communication with said cell stack assemblies and capable of conducting current between said cell stack assemblies;
    supplying said manifold assembly with a reactant stream;
    physically dividing said reactant stream prior to said reactant stream being presented to said cell stack assemblies;
    feeding a substantially uniform portion of said reactant stream to each of said cell stack assemblies; and
    channeling said reactant stream exhausted by said cell stack assemblies through said manifold assembly and away from said fuel cell power plant.

12. The method for increasing the operational efficiency of a fuel cell power plant according to claim 11, said method further comprising the steps of:
    forming a baffle within said manifold assembly to provide separate pathways for providing and exhausting said reactant stream to and from said cell stack assemblies.

13. The method for increasing the operational efficiency of a fuel cell power plant according to claim 12, said method further comprising the steps of:
    supplying said reactant stream to said cell stack assemblies through a top portion of said manifold assembly in fluid communication with a reactant inlet plenum formed in part by said housing; and
    removing said exhausted reactant stream from said cell stack assemblies through a reactant exhaust plenum formed in part by said housing in fluid communication with a bottom portion of said manifold assembly.

14. The method for increasing the operational efficiency of a fuel cell power plant according to claim 13, said method further comprising the steps of:
    having said reactant stream being one of an oxidant stream and a fuel stream.

15. The method for increasing the operational efficiency of a fuel cell power plant according to claim 12, said method further comprising the steps of:
    forming said manifold assembly to include a pair of planar side walls with said baffle being approximately orthogonally disposed therebetween; and
    orienting said side walls to be in electrical communication with said cell stack assemblies.

16. The method for increasing the operational efficiency of a fuel cell power plant according to claim 15, said method further comprising the steps of:
    coating said side walls with an electrically conductive plating.

17. The method for increasing the operational efficiency of a fuel cell power plant according to claim 16, said method further comprising the steps of:
    forming said baffles and said side walls from a corrosion resistant metal; and
    coating said side walls with a gold plating.

18. A fuel cell power plant according to claim 16, wherein:
    coating said side walls with one of a nickel and a nickel alloy plating.

* * * * *